Patented Sept. 4, 1945

2,384,132

UNITED STATES PATENT OFFICE 2,384,132

COATING COMPOSITIONS

James Wallace Raynolds, Easton, Pa.

No Drawing. Application September 17, 1941,
Serial No. 411,245

4 Claims. (Cl. 260—3)

This invention relates to coating compositions; and it comprises an improved coating composition having chlorinated rubber as its major film-forming constituent and containing a vinyl acetate polymer in sufficient quantity of make films of the coating composition resistant to oils and greases and also containing a plasticizer; the vinyl acetate polymer and the plasticizer advantageously being present in substantially equivalent amounts on the order of 5 per cent to 30 per cent by weight of the amount of chlorinated rubber; all as more fully hereinafter set forth and as claimed.

This application is a continuation-in-part of my prior and copending application Serial No. 253,681, now issued as U. S. Patent No. 2,287,063.

The rubber chloride constituting the principal film-forming constituent of my improved coating compositions advantageously contains 65 per cent or more of chlorine. Chlorinated rubbers with chlorine contents of 64 to 66 per cent or more have been known for several years and can be produced in various ways. Such combinations are frequently somewhat brittle resins having interesting characteristics including resistance to the solvent action of water and aqueous solutions of acids, alkalies and salts, as well as alcohol, mineral oil and other organic solvents. Rubber chloride is, however, softened and eventually dissolved by contact with certain vegetable oils and essential oils. Because of this fact, rubber chloride has not heretofore had the wide application in coating compositions to which it is entitled by its outstanding characteristics.

In the acknowledged application Serial No. 253,681, now issued as U. S. Patent No. 2,287,063, I have disclosed that the addition of a minor amount of polymeric vinyl acetate to rubber chloride eliminates the susceptibility of films formed therefrom to softening, attack, or dissolution by vegetable oils, greases and the like. Rubber chloride coatings are thus rendered grease-proof. The amount of vinyl acetate polymer which is employed for this purpose usually varies from 5 per cent to about 30 per cent by weight of the amount of rubber chloride, and it is frequently found that amounts in the range from 10 per cent to 20 or 25 per cent are most advantageous. The vinyl acetate polymer is decidedly more advantageous for the purpose of rendering chlorinated rubber films resistant to greases and oils than other vinyl polymers, such as vinyl chloride and the mixed polymers which are widely used commercially, in "Vinylite" compositions, for example. Such polymers other than vinyl acetate have relatively little effect on the susceptibility of rubber chloride to vegetable oils and greases.

As also disclosed in the acknowledged application, it is frequently desirable to include plasticizers in the grease-proofed rubber chloride compositions. Any of numerous plasticizers are suitable. In the said application, the use of these grease-proofed rubber chloride compositions with and without plasticizers as coatings for the liners of container closures is specifically described and claimed.

In addition to the utility in the closure industry of these plasticized rubber chloride compositions, grease-proofed by the addition of a vinyl acetate polymer, such compositions have numerous other utilities. One of these is in the field of furniture finishes. Chlorinated rubber has many properties which would make it outstanding as a major ingredient of furniture finishing compositions. For example, it has remarkable resistance to abrasion, and in suitably plasticized films has good thermal stability; that is, it is not readily deformed in contact with a warm surface and does not crack or check in contact with a cold surface. Also, suitable solutions for spraying may readily be prepared, and the sprayed solutions dry rapidly to form a glossy film having excellent properties as a wood finish.

However, there has been one defect which has largely precluded the use of rubber chloride as a major constituent of furniture finishes heretofore. As noted, rubber chloride is readily soluble in, or softened by, various vegetable oils, such as cottonseed oil and olive oil. Vegetable oils are constituents of many furniture polishes and are also commonly used in and about the home for other purposes, and it has been recognized that because of these circumstances, chlorinated rubber finishes on furniture might be subject to serious damage in the course of ordinary usage.

However, this difficulty is eliminated by incorporating a suitable proportion of polyvinyl acetate, such as 10 to 25 per cent by weight on the rubber chloride, in the coating composition, in accordance with my invention. The vinyl acetate polymer imparts adequate resistance to vegetable oils and eliminates the only substantial objection which has been raised to the utilization of chlorinated rubber in furniture finishes.

In most furniture finishes and other coating compositions, it is desirable to include an organic plasticizer or similar modifying agent, and that is generally true in the compositions of the present invention. In general, the inclusion of plasticizers in rubber chloride coating compositions tends to decrease the resistance of films formed from the composition to alcohol and certain other reagents which are admirably resisted by the rubber chloride alone. However, if the amount of plasticizer used in the grease-proofed rubber chloride compositions of this invention does not exceed 25 per cent by weight on the rubber chloride, the resistance to alcohol, etc., is not substantially impaired. In the case of most plasticizers, quantities exceeding about 25 per cent on the rubber chloride are therefore to be avoided, although slightly larger amounts, up to 30 per cent or more, are permissible when using certain plasticizers, such as chlorinated paraffin and oil modified alkyd resins.

Various plasticizers of numerous types may be used to advantage in the grease-proofed rubber chloride compositions of this invention. Among these are chlorinated paraffin containing from 32 per cent to 52 per cent of combined chlorine, and long oil modified alkyd resins, such as the composition sold commercially as Rezyl X-315 which is sold by American Cyanamid & Chemical Corporation who describe its composition as follows:

| | |
|---|---|
| Solids _____ per cent__ | 100 |
| Solvent _____ | None |
| Color _____ | 3-4 |
| Viscosity _____ | W-Y |
| Lbs. per gallon _____ | 8.7 |
| Minimum phthalic anhydride (solids) per cent__ | 9 |
| Acid number (solids) _____ | 13-19 |

This resin is a plasticizing type alkyd resin made as a viscous liquid by the chemical combination of dicarboxylic acids, polyhydric alcohols, and non-drying oils, the latter constituting from 60-70% of the composition. Other useful plasticizers for these coating compositions include tricresyl phosphate, dicresyl carbitol, methyl phthalyl glycollate and dibutyl phthalate.

Specific examples of coating compositions prepared in accordance with this invention and useful as furniture lacquers for spray application are as follows:

Example 1

| | Parts by weight |
|---|---|
| 20 cps. chlorinated rubber _____ | 10.0 |
| 15 cps. polyvinyl acetate _____ | 2.0 |
| Chlorinated paraffin 40% Cl₂ _____ | 3.0 |
| Solvents: | |
| Toluol _____ | 20.0 |
| Butyl acetate _____ | 20.0 |
| | 55.0 |

Example 2

| | Parts by weight |
|---|---|
| 20 cps. chlorinated rubber _____ | 10.0 |
| 15 cps. polyvinyl acetate _____ | 3.0 |
| Long oil modified alkyd resin (such as Rezyl X-315) _____ | 3.0 |
| Solvents: | |
| Toluol _____ | 20.0 |
| Butyl acetate _____ | 20.0 |
| | 56.0 |

In such compositions flatting agents such as zinc stearate, aluminum stearate, etc., may be incorporated to produce flat finishes if desired. Under-coats or sanding sealers may be formulated by the addition of large quantities of these flatting agents. Also, compatible pigments may be included in these compositions to produce colored finishes.

The plasticized and grease-proofed coating compositions of this invention have been described hereinabove with special reference to their utility as furniture finishes. However, such coating compositions have numerous other utilities, and it is to be understood that the invention is not limited, except as indicated in the appended claims. The essential feature of the invention is the combination, in a coating composition adapted for use as a furniture finish and in other applications, of rubber chloride constituting the principal film-forming constituent with polyvinyl acetate in sufficient quantity (advantageously from 10 to 25 per cent) to make the film grease resistant and a plasticizer of such type and present in such quantity that resistance to alcohol, etc., is not impaired. Any good quality chlorinated rubber may be used in the coating compositions of this invention, but especially desirable results are obtained with the high purity rubber chloride obtainable in accordance with my copending application Serial No. 245,293 filed December 12, 1938.

What I claim is:

1. A coating composition comprising chlorinated rubber as the principal film forming constituent and containing polymerized vinyl acetate in an amount from 5% to 30% by weight on the amount of the rubber chloride and containing a plasticizer selected from the group consisting of chlorinated paraffin and a liquid long oil non-drying oil modified alkyd resin in an amount of from about 25% to 30% by weight on the amount of rubber chloride, the amount of plasticizer being such that resistance to alcohol is not impaired.

2. A coating composition according to claim 1 wherein the plasticizer is chlorinated paraffin.

3. A coating composition according to claim 1 wherein the plasticizer is a long oil non-drying oil liquid modified alkyd resin.

4. A furniture finish comprising chlorinated rubber as the principal film forming constituent and containing polymerized vinyl acetate in an amount from 5% to 30% by weight on the amount of the rubber chloride and containing as a plasticizer a liquid long oil non-drying oil modified alkyd resin in an amount of about 25% to 30% by weight on the amount of rubber chloride, and a volatile vehicle, the amount of plasticizer being such that resistance to alcohol is not impaired.

JAMES W. RAYNOLDS.